July 17, 1951 E. I. ANDERSON 2,561,087

FREQUENCY MODULATION-AMPLITUDE MODULATION RECEIVER CIRCUITS

Filed Dec. 4, 1945 2 Sheets-Sheet 1

INVENTOR
EARL I. ANDERSON
BY
H. S. Grover
ATTORNEY

FREQUENCY MODULATION-AMPLITUDE MODULATION RECEIVER CIRCUITS

Filed Dec. 4, 1945 2 Sheets-Sheet 2

INVENTOR
EARL I. ANDERSON
BY
H. S. Grover
ATTORNEY

Patented July 17, 1951

2,561,087

UNITED STATES PATENT OFFICE 2,561,087

FREQUENCY MODULATION-AMPLITUDE MODULATION RECEIVER CIRCUITS

Earl I. Anderson, Manhasset, N. Y., assignor to Radio Corporation of America, a corporation of Delaware Application December 4, 1945, Serial No. 632,727

8 Claims. (Cl. 250—20)

My present invention relates generally to tunable circuits for use in multi-band radio receivers, and more particularly to such circuits which are capable of efficient operation in the FM and AM bands.

With the recent change of the FM band from the 45 mc. range to 88–108 mc., the problems involved in the design of a combinded AM-FM receiver are greatly increased, if the same tubes, tuning condensers, band-switches, etc., which were used at the lower frequencies, are still to be used. With the normal capacities existing across the high frequency circuits utilized in such receivers, the amount of inductance which can be used is so small that a major portion of it will be in the band-switch and in the leads to the switch. In fact, the inductance of the switch and leads in such as to make the coil, as a physical entity, practically non-existent. This inductance has rather bad characteristics from a Q and stability standpoint.

It is therefore one of the objects of my invention to provide simplified and improved tunable circuits adapted for operation over the present AM and FM broadcast bands which avoid the disadvantages due to the band-switch used in prior circuits.

Another object of my invention is to provide a tunable network for a multi-band receiver which provides a series tuned circuit for FM reception and a parallel tuned circuit for AM reception thereby utilizing the advantages of each type of tuned circuit in its respective band.

Other objects and advantages of the invention will best be understood by consideration of the following description taken together with the accompanying drawings, in which.

Figure 1:
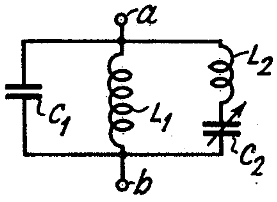
Fig. 1 is the fundamental circuit on which the present invention is based and which will be used for purpose of explanation.

Referring first to Fig. 1 there is shown a network consisting of an inductance $L_1$ across which there is connected a condenser $C_1$ and also the series circuit of an inductance $L_2$ and a variable condenser $C_2$. The network of Fig. 1 has three distinct resonant frequencies. A first or series resonant frequency is that at which inductance $L_2$ and condenser $C_2$ have equal reactances. When $L_1$ is an inductance of a value commonly used to efficiently resonate over the AM broadcast band and $L_2$ is very small, of the order of ¼ $\mu$h., $C_1$ may be of the order of 30 $\mu\mu$f. as is the case if it is largely composed of the inevitable input and output capacitances of the associated vacuum tubes and a small padder, if the network of Fig. 1 were used as an interstage coupling element, while $C_2$ is a variable tuning condenser of suitable value (15–30 $\mu\mu$f.) to cover the FM band. For the relatively low frequencies in the broadcast band, $L_2$ would merely be the equivalent of a long lead to condenser $C_2$ and its effect could be ignored. A second, parallel resonant frequency occurs at a frequency determined by $L_1$ and the shunt capacity of $C_1 + C_2$ in parallel. A third resonance occurs at a very high frequency (in this case at about 100 mc. in the FM band) where the net capacitive reactance of $C_1$ and $L_1$ in parallel is equal to the net inductive reactance of $L_2$ and $C_2$ in series. Varying $C_2$ shifts the resonant frequencies.

Figure 2:
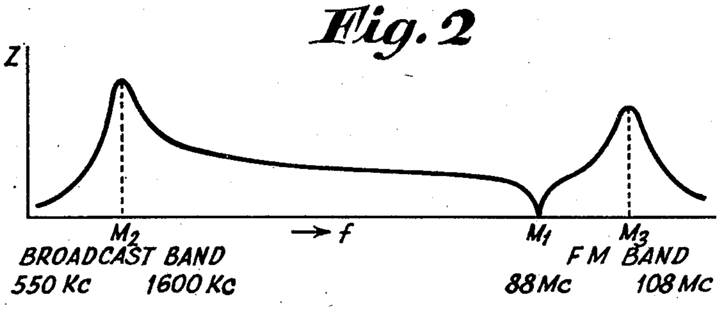
Fig. 2 is a curve showing the impedance-frequency relation of the circuit shown in Fig. 1.

In Fig. 2 there is plotted the impedance of the network of Fig. 1 vs. frequency, for signals applied between *a* and *b*. $M_1$ is the minimum impedance of the network and occurs at the first resonant frequency mentioned above. $M_2$ is the low frequency maximum and occurs at the second resonant frequency, and $M_3$ is the high frequency maximum and occurs at the third resonant frequency.

The series resonant frequency will always be lower in frequency than the high parallel-resonant frequency and the separation between them is a function of the relative values of $L_2$ and $C_2$. With suitable constants employed, the network of Fig. 1 would be suitable as a coupling element in the RF portion of an AM-FM receiver. By varying the capacitance $C_2$, the parallel resonances may be used to obtain the desired gain and selectivity characteristics in the two bands and the series resonant frequency may be used to improve the image ratio in the FM band if the local FM oscillator is on the low frequency side of the signal. Since the tuning of a simple oscillator to accurately coincide the track of the series resonant circuit at the heterodyne image frequency of the parallel resonant circuits, the image ratio will generally be improved over only a portion of the band. To further improve the image rejection, an image suppression trap may be added, preferably at the high frequency end of the band where image rejection is inherently poorer.

The novel circuit can be used without a band-switch as shown in Fig. 1. It is not very practical with the standard AM and FM bands however, because the same variable tuning condenser $C_2$ cannot be used to satisfactorily cover the different ranges of these bands.

Figure 3:
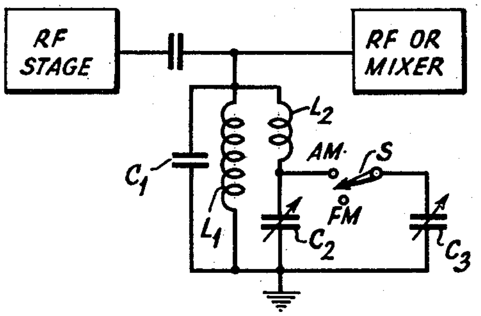
Figs. 3 to 6 are practical circuits which were derived from the circuit of Fig. 1 and which embody the invention.

A more practical circuit utilizing separate tuning condensers for the AM and FM bands is shown in Fig. 3. Here $C_2$ is a relatively small variable condenser of the proper size (15–30 $\mu\mu$f.) to tune over the FM band and $C_3$ is an AM tuning condenser. A band selector switch S has its arm connected to the high potential side of condenser $C_3$. One of the switch contacts marked AM is connected to the junction of $L_2$ and $C_2$ and the other switch contact marked FM is left blank. For FM the circuit is exactly as shown in Fig. 1 except for the connection to the junction of $C_2$ and $L_2$ of the switch contact AM. This is not serious since the contact simply adds a small amount of shunt capacity across the condenser $C_2$ which has high minimum capacitance anyway. For operation in the AM band, condenser $C_3$ is switched in for connection across condenser $C_2$ to provide the additional capacity required to tune the circuit over this band. Since in the AM band $C_1$, $C_2$ and the minimum capacitance of $C_3$ total approximately 65 or 70 $\mu\mu$f., a maximum capacity of about 700 $\mu\mu$f. is required for the AM tuning condenser $C_3$ to cover the band. While the use of such a larger-than-normal tuning condenser does not detract from the advantages that are gained at the FM frequencies, it can be avoided, as explained in connection with the circuit of Fig. 5, if cost is a primary consideration.

Figure 4:
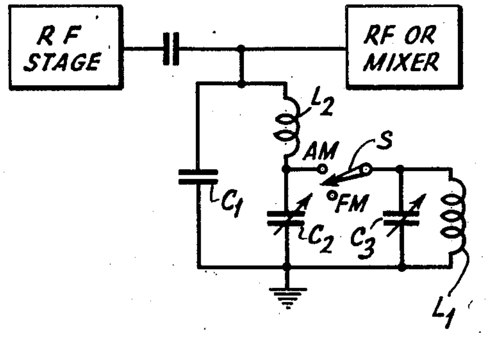

Because the circuit of Fig. 3 has high gain at two frequencies it is possible that a signal at the unwanted frequency may have sufficient amplitude to cause cross-modulation difficulties. When receiving signals in the FM band with the circuit of Fig. 3, the gain due to signals in the AM band may be considerably reduced by placing $L_1$ across $C_3$ as shown in Fig. 4. Inasmuch as $L_1$ appears as a capacity at the frequencies in the FM band, so relocating $L_1$ has the effect of reducing $C_1$ in the operation of the circuit in the FM band so that there results an increase in the gain. When receiving signals in the AM band, the gain may be reduced substantially at FM frequencies in various ways as explained in connection with Fig. 7.

Figure 5:
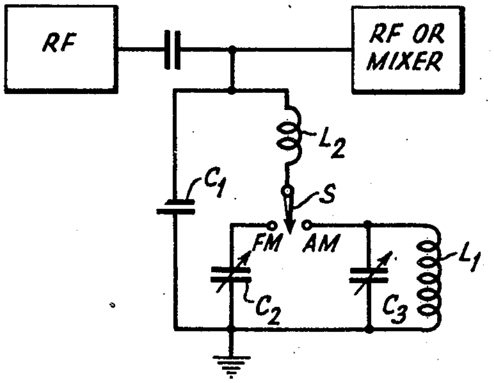

The value of the inductance used at $L_2$ in Figs. 3 and 4 is several times as great as may be used in more conventional circuits. For that reason the band-switch may be placed in series with the coil with much less effect than in normal circuits. By placing the switch S in series with the coil, as shown in Fig. 5, the minimum capacity of the circuit in the AM band may be reduced to the extent of the value of the minimum capacity of $C_2$ and its trimmer which amounts to about 20 $\mu\mu$f. or so. This results in a reduction of about 200 $\mu\mu$f. in the maximum capacity which $C_3$ is required to have.

Figure 6:
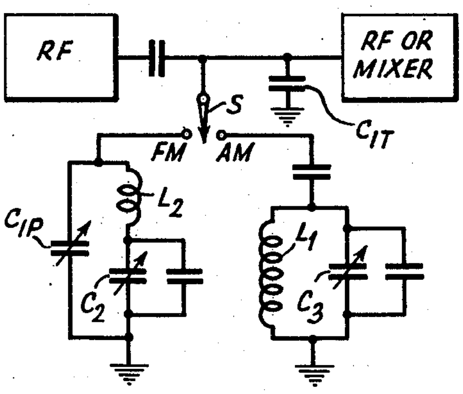

A further embodiment of an AM-FM network suitable for use as an interstage coupling element is disclosed in Fig. 6. In this circuit the capacitance $C_1$ of the previous circuits is replaced by its two constituent parts designated $C_{1p}$ and $C_{1t}$, where $C_{1p}$ is the variable padder and $C_{1t}$ is the tube capacitances plus stray circuit capacitances. In this circuit $C_{1p}$ is not present in the AM band thereby further reducing the minimum capacitance in that band. If the magnitude of $C_{1t}$ is very small, improved performance can be realized with the circuit of Fig. 6 over that of Fig. 5. The circuit retains series tuning in the FM band thereby still retaining the advantage of improved image rejection if the oscillator is on the low frequency side.

Figure 7:
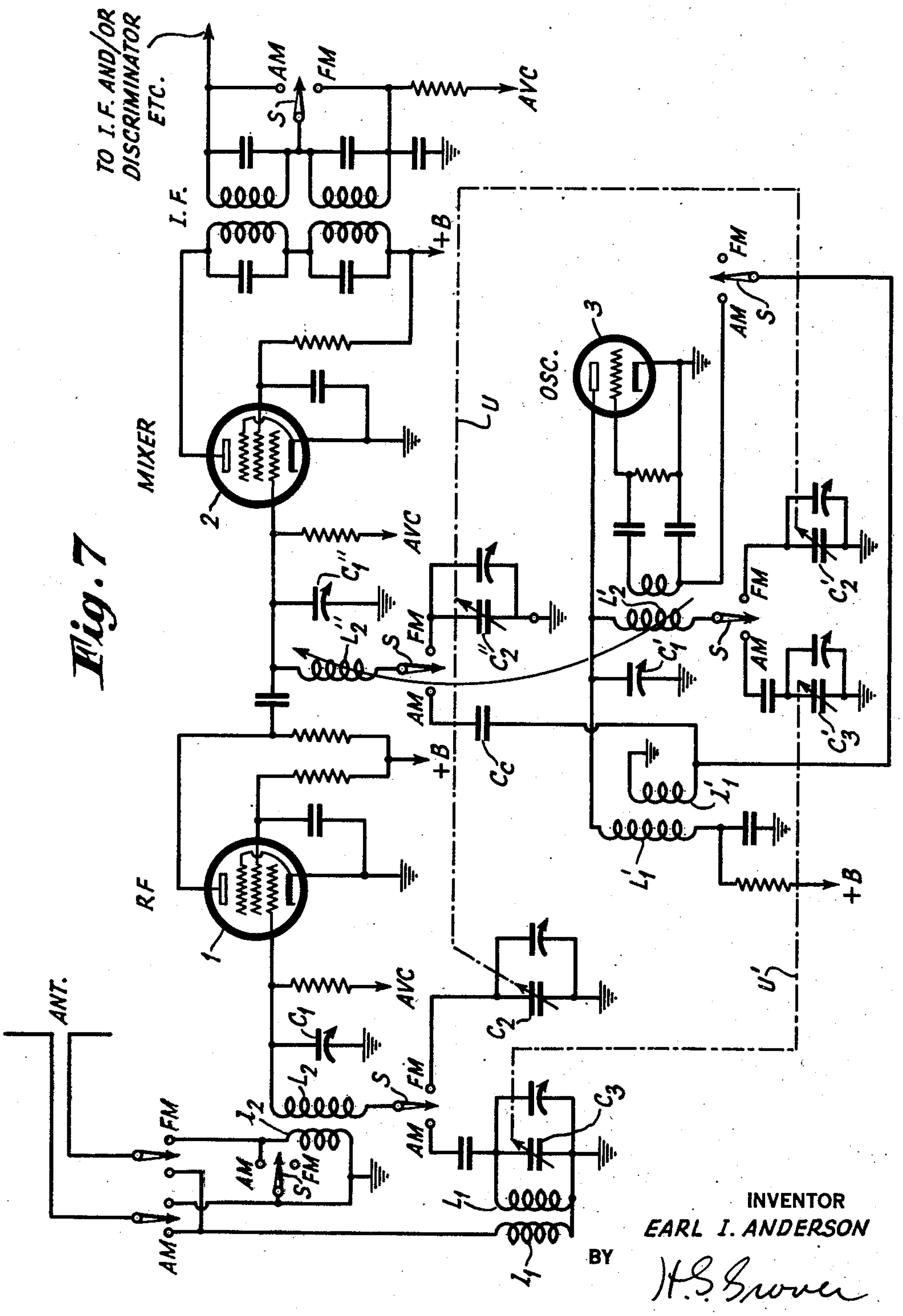
Fig. 7 is the circuit of the high frequency end of a superheterodyne receiver embodying the features disclosed in other figures.

In Fig. 7 I have shown the high frequency end of an AM-FM receiver employing RF, mixer and oscillator tubes 1, 2 and 3, respectively, and in which the RF and oscillator circuits embody practical versions of the circuits described above. The tunable RF circuits are like those of Fig. 5 and are similarly labeled. For FM reception the signal input circuit $L_2$—$C_2$ to the mixer and the oscillator circuit $L'_2$—$C'_2$ of the local oscillator 3 are series-tuned as in the previous circuits, coupling between said circuits being provided by the mutual inductance between the coils $L'_2$ and $L''_2$. The three variable condensers $C_2$, $C''_2$ and $C'_2$ in the RF, mixer and oscillator circuits respectively are interconnected for unicontrol operation, as represented by the dash line U, for tuning the receiver through the FM band. For AM reception the parallel-tuned circuit $L_1$—$C_3$ in the input to the RF stage and the parallel-tuned circuit $L'_1$—$C'_3$ of the local oscillator are effective, the two variable condensers $C_3$ and $C'_3$ in these stages being interconnected for unicontrol operation, as represented by the chain line U', for tuning the receiver through the AM band. Oscillations for tuning in the AM band are supplied to the mixer input (which is untuned for AM reception) by way of coupling condenser $C_c$ connected to the oscillator feedback coil $l'_1$. For the FM band there is no feedback circuit resonant to the AM frequencies. The oscillator feedback for the AM band is made relatively high so that the oscillator has no tendency to oscillate at the FM frequencies.

The receiver circuit of Fig. 7 offers far better performance and simpler mechanical construction than the more conventional circuits which shunt the FM coil with all of the circuit capacities including that of the tuning condenser. In addition the circuit provides improved image ratio over a substantial portion of the FM band. This image rejection requires no extra parts but only the proper choice of circuit parameters. For maximum image rejection $L_2$ and $C_2$ should be series resonant at the image frequency at the same time that the circuit is parallel resonant at the signal frequency.

In order to avoid any possible cross-modulation effects when receiving signals in the AM band, the gain may be reduced at FM frequencies by shorting the input coil $l_2$ of the RF stage, and also by having the circuit between the RF and mixer stages untuned in the AM band as mentioned above.

While I have shown and described certain preferred embodiments of my invention it will be understood that various modifications and changes will occur to those skilled in the art without departing from the spirit and scope of this invention.

What I claim is:

1. A network selectably tunable through low and high frequency bands comprising a pair of signal carrying conductors, a substantially fixed capacitance between said conductors, low and high frequency inductances, low and high frequency variable condensers, and band selector means selectably operable between two positions in one of which it connects the high frequency variable condenser in series with the high frequency inductance between the conductors to form a closed circuit which is parallel resonant at the high frequency band and in the other position, the band selector means connects the low and high frequency inductances and the low frequency variable condenser in a circuit between the conductors which is parallel resonant at the low frequency band, the high frequency variable condenser and inductance being series resonant at a frequency intermediate the low and high frequency bands.

2. A tuning system for a superheterodyne radio receiver adapted to receive selectively amplitude-modulated carrier waves or frequency-modulated carrier waves and having heterodyne means for the frequency-modulated carrier waves including oscillator supply elements connected for supplying heterodyning oscillations at a frequency lower than the received frequency-modulated carrier waves, said tuning system comprising a pair of radio signal carrying conductors, a substantially fixed capacitance between said conductors, low and high frequency inductances, low and high frequency variable condensers, a fixed capacitance, and band selector means selectably operable between two positions in one of which it connects the high frequency variable condenser in series with the high frequency inductance between the conductors to form with the capacitance a closed circuit which is parallel resonant at frequencies in the frequency-modulated carrier wave range, and in the other position, the band selector means connects the low and high frequency inductances, the capacitance and the low frequency variable condenser in a circuit between the conductors which is parallel resonant at frequencies in the amplitude-modulated carrier wave range, the high frequency inductance and variable condenser being series resonant at a frequency below the frequency-modulated carrier wave range and at least partially in the range of heterodyne image frequencies of the frequency-modulated carrier waves.

3. A tuning system for a radio receiver adapted to receive selectively amplitude-modulated carrier waves or frequency-modulated carrier waves, said system comprising a first inductance element and a first variable condenser element connected in series, a capacitance shunted across said series-connected elements and forming therewith a circuit which is parallel resonant at frequencies in the frequency-modulated carrier wave range, a second inductance element shunted by a second variable condenser element, and switch means interposed for disconnecting said first variable condenser element and for connecting instead said shunt connected elements effectively across the capacitance and in series with said first inductance element to provide a circuit which is parallel resonant at frequencies in the amplitude-modulated carrier wave range.

4. A tuning system for a superheterodyne radio receiver adapted to receive selectively amplitude-modulated carrier waves or frequency-modulated carrier waves and having heterodyne means for the frequency-modulated carrier waves including oscillator supply elements connected for supplying heterodyning oscillations at a frequency lower than the received frequency-modulated carrier waves, said tuning system comprising a first inductance element and a first variable condenser element connected in series, said elements constituting a circuit which is series resonant to at least some of the heterodyne image frequencies of the frequency-modulated carrier waves, a capacitance shunted across said series circuit and forming therewith a network which is parallel resonant at frequencies in the frequency-modulated carrier wave range, a second inductance element shunted by a second variable condenser element, and switch means interposed for disconnecting the first variable condenser in said network and for connecting instead said shunt connected elements in series with said first inductance element to convert the network to one which is parallel resonant at frequencies in the amplitude-modulated carrier wave range.

5. In a tuning system for selectively passing alternating electric signals in two separate frequency ranges in the presence of undesired signals in an intervening frequency range; selective circuit elements including a pair of signal-carrying conductors, a substantially fixed capacitance, a first substantially fixed inductance, tuning means consisting of a second substantially fixed inductance, a first and a second tunable capacitance element, and circuit means for selectively connecting said first tunable capacitance element and said first inductance together in series between said conductors, and for inserting said fixed capacitance, said second inductance and said second tunable capacitance element effectively in parallel between said conductors; said first tunable capacitance element tuning with said fixed capacitance and said first inductance to present, between said conductors, a high impedance to a first range of desired signal frequencies, said second tunable capacitance element tuning with said fixed capacitance and the effective second inductance to present, between said conductors, a high impedance to a second range of desired signal frequencies and said first tunable capacitance element tuning with said first inductance to an intervening range of frequencies for presenting between said conductors a low impedance to at least some of said undesired signals and improving the rejection of said last-mentioned signals at the same time as the conductors are caused to selectively pass desired signals.

6. In a selective circuit system for selectively passing desired alternating electric signals in separate frequency ranges in the presence of undesired signals in an intervening frequency range: a pair of signal carrying conductors; signal selective elements including a low frequency inductance, a high frequency inductance, a substantially fixed capacitance, tuning means comprising a first tuning capacitor, and circuit elements for inserting said fixed capacitance between said conductors, for connecting the high frequency inductance in series with said tuning capacitor between said conductors and in parallel to said capacitance, and for effectively connecting said low frequency inductance between the conductors in parallel with said capacitance; said high frequency inductance, said capacitance and said tuning capacitor forming a high frequency load circuit resonant to the desired signals in the higher of the separate frequency ranges; said low frequency inductance with said capacitance forming parts of a load circuit for the desired signals in the lower of the separate frequency ranges; said high frequency inductance resonating with the tuning capacitor to form a low impedance shunt for at least some of the undesired signals; and means connecting an additional tuning capacitor across the low frequency inductance to tune the low frequency load circuit to the desired signals only in the low frequency range.

7. The combination as defined in claim 6, in which the low frequency load circuit resonates at frequencies outside of the low frequency range.

8. The combination as defined by claim 6 in which the circuit elements include selectable switch means connected for disconnecting the first tuning capacitor, and for disconnecting the low frequency inductance and the additional tuning capacitor.

EARL I. ANDERSON.

REFERENCES CITED

The following references are of record in the file of this patent:

UNITED STATES PATENTS

| Number | Name | Date |
|---|---|---|
| 1,819,299 | Miller | Aug. 18, 1931 |
| 1,850,831 | Elliott | Mar. 22, 1932 |
| 1,930,691 | Posthumus | Oct. 17, 1933 |
| 1,943,790 | Franks | Jan. 16, 1934 |
| 1,961,720 | Van Der Pol | June 5, 1934 |
| 2,005,772 | Chireix | June 25, 1935 |
| 2,097,359 | Albright | Oct. 26, 1937 |
| 2,106,229 | Sinninger | Jan. 25, 1938 |
| 2,475,032 | Koch | July 5, 1949 |

FOREIGN PATENTS

| Number | Country | Date |
|---|---|---|
| 799,927 | France | June 23, 1936 |